(12) United States Patent
Kang

(10) Patent No.: US 11,509,016 B2
(45) Date of Patent: Nov. 22, 2022

(54) PAPERS USEFUL AS THERMAL INSULATION AND FLAME BARRIERS FOR BATTERY CELLS

(71) Applicant: DUPONT SAFETY & CONSTRUCTION, INC., Wilmington, DE (US)

(72) Inventor: Byoung Sam Kang, Midlothian, VA (US)

(73) Assignee: DUPONT SAFETY & CONSTRUCTION, INC., Wilmington, DE (US)

( * ) Notice: Subject to any disclaimer, the term of this patent is extended or adjusted under 35 U.S.C. 154(b) by 394 days.

(21) Appl. No.: 16/784,413

(22) Filed: Feb. 7, 2020

(65) Prior Publication Data

US 2020/0295328 A1    Sep. 17, 2020

Related U.S. Application Data

(60) Provisional application No. 62/818,769, filed on Mar. 15, 2019.

(51) Int. Cl.
| | |
|---|---|
| H01M 50/24 | (2021.01) |
| D21H 13/26 | (2006.01) |
| D21H 17/55 | (2006.01) |
| D21H 17/68 | (2006.01) |
| D21H 27/00 | (2006.01) |
| H01M 50/44 | (2021.01) |
| H01M 50/411 | (2021.01) |
| H01M 50/463 | (2021.01) |

(52) U.S. Cl.
CPC ............ *H01M 50/24* (2021.01); *D21H 13/26* (2013.01); *D21H 17/55* (2013.01); *D21H 17/68* (2013.01); *D21H 27/00* (2013.01); *H01M 50/411* (2021.01); *H01M 50/44* (2021.01); *H01M 50/463* (2021.01)

(58) Field of Classification Search
CPC ....... Y02E 60/10; H01M 10/60; H01M 50/24; H01M 50/411; H01M 50/463; H01M 50/44; D21H 27/00; D21H 15/08; D21H 17/68; D21H 13/26; D21H 15/00; D21H 17/55

USPC .......................................... 429/149; 162/146
See application file for complete search history.

(56) References Cited

U.S. PATENT DOCUMENTS

| | | | |
|---|---|---|---|
| 2,093,454 A | 9/1937 | Kistler | |
| 2,188,007 A | 1/1940 | Kistler | |
| 2,249,767 A | 7/1941 | Kistler | |
| 2,988,782 A | 6/1961 | Parrish et al. | |
| 2,999,788 A | 9/1961 | Morgan | |
| 3,063,966 A | 11/1962 | Kwolek et al. | |
| 3,227,793 A | 1/1966 | Cipriani | |
| 3,287,324 A | 11/1966 | Sweeny | |
| 3,414,645 A | 12/1968 | Morgan | |
| 3,756,908 A | 9/1973 | Gross | |
| 3,767,756 A | 10/1973 | Blades | |
| 3,869,429 A | 3/1975 | Blades | |
| 3,869,430 A | 3/1975 | Blades | |
| 5,026,456 A | 6/1991 | Hesler et al. | |
| 5,482,773 A | 1/1996 | Bair | |
| 5,667,743 A | 9/1997 | Tai et al. | |
| 6,312,561 B1 * | 11/2001 | Forsten .................. | D21H 13/26 162/157.2 |
| 8,518,335 B2 | 8/2013 | Joung et al. | |
| 8,961,919 B2 | 2/2015 | Joung et al. | |
| 2013/0129963 A1 | 5/2013 | Fernando et al. | |
| 2017/0004908 A1 * | 1/2017 | Kang ........................ | B32B 5/16 |

FOREIGN PATENT DOCUMENTS

| | | |
|---|---|---|
| WO | 01-53605 A1 | 7/2001 |
| WO | 2017/004187 A1 | 1/2017 |

OTHER PUBLICATIONS

International Search Report and Written Opinion, issued from International Application No. PCT/US2020/022079, dated Jun. 17, 2020.

* cited by examiner

*Primary Examiner* — Mark Halpern

(57) ABSTRACT

A paper suitable for use as a cell-to-cell flame barrier in a battery, and a battery comprising the paper, the paper comprising 40 to 70 weight percent fibrids and 30 to 60 weight percent mica, based on the total weight of the fibrids and mica in the paper; wherein the fibrids comprise a blend of 80 to 20 weight percent polymer and 20 to 80 weight percent aerogel powder, based on the total weight of the polymer and aerogel powder in the fibrids; the paper having a thickness of 100 to 4000 micrometers.

12 Claims, 4 Drawing Sheets

PAPERS USEFUL AS THERMAL INSULATION AND FLAME BARRIERS FOR BATTERY CELLS

BACKGROUND OF THE INVENTION

Field of the Invention

This invention relates to a paper useful as a flame barrier and fire-retardant cell-to-cell thermal insulation for batteries, and a battery comprising the same.

Description of Related Art

The growth of the use of lithium-ion and other batteries in electrical vehicles has been accompanied by an increase in dramatic battery failures involving overheating and fire. There is a need for flame barriers and fire-retardant insulation to separate battery cells and prevent overheating and hot spots in one cell from causing the entire battery pack to evolve into a thermal runaway condition that could result in fire or explosion.

In addition, some proposed materials for such insulation have attributes that are undesirable to the manufacturers of batteries. Some insulating materials have a high propensity to shed particles, which is undesirable in that they create dust and other problems in processes such as those that require high speed automatic adhesive tape application on the surface of insulation. Particle shedding also impacts the bonding between the surface of insulation and the adhesive tape, causing movement and/or misalignment of the insulation due to vibrations (such as road vibrations) most electrical vehicles experience during normal operation.

What is needed are flame barrier structures that can provide improved thermal insulation but also do not have undesirable attributes such as shedding.

BRIEF SUMMARY OF THE INVENTION

This invention relates to a paper suitable for use as a cell-to-cell flame barrier in a battery, and a battery comprising that paper; the paper comprising:
  40 to 70 weight percent fibrids, and
  30 to 60 weight percent mica, based on the total weight of the fibrids and mica in the paper; wherein the fibrids comprise a blend of:
  80 to 20 weight percent polymer, and
  20 to 80 weight percent aerogel powder, based on the total weight of the polymer and aerogel powder in the fibrids; the paper having a thickness of 100 to 4000 micrometers.

DETAILED DESCRIPTION OF THE INVENTION

Figure 1:
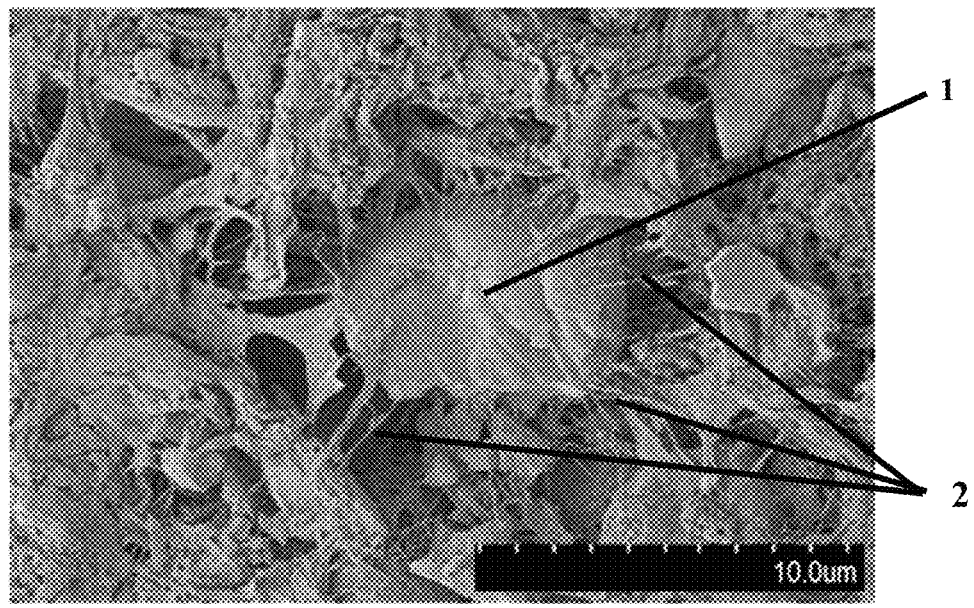
FIG. 1 is a surface SEM photo image of the paper made solely from fibrids, wherein the fibrids were made from a blend of polymer and aerogel powder.

This invention relates to a paper suitable for use as a cell-to-cell flame barrier in a battery, the paper being a paper containing mica and a fibrid binder, fibrid binder comprising a blend of polymer and aerogel powder, the paper having improved insulative and other properties over commercially available mica papers.

The paper comprises 40 to 70 weight percent fibrids and 30 to 60 weight percent mica, based on the total weight of the fibrids and mica in the paper; wherein the fibrids comprise a blend of 80 to 20 weight percent polymer and 20 to 80 weight percent aerogel powder, based on the total weight of the polymer and aerogel powder in the fibrids; the paper having a thickness of 100 to 4000 micrometers.

Multi-cell battery structures have battery cells positioned either in parallel or in series and are commonly known as battery blocks and battery packs. In these multi-cell battery structures, the heat energy from unusual thermal issues, such as faults or failures, in one cell can propagate to adjacent cells. If the thermal issues are severe enough they can propagate from cell-to-cell and cause a runaway thermal condition that can cascade to all the cells in the battery block or pack, resulting in a fire or even worse.

By "cell-to-cell insulation" it is meant to include materials that are inserted between individual battery cells in a multi-cell battery structure that provide thermal insulation; that is, they attempt to thermally isolate each battery cell and also retard the transfer of heat energy should the battery cell develop a thermal "hot spot" or have an unusual thermal issue such as a thermal runaway, which could result in an explosion.

The paper comprises a mixture of 40 to 70 weight percent aerogel-containing fibrids and 30 to 60 weight percent mica, based on the total weight of the fibrids and mica in the paper. To protect neighboring battery cells from overheated cells, better flame barriers and fire-retardant insulation have low thermal conductivity as well as high dimensional stability at higher temperatures. When a thermal event occurs, the overheated cell temperature can go up as high as 800° C. and even higher; however, neighbor cells should be maintained at 200° C. or lower. Therefore, thermal insulation between neighboring cells is preferably adequately thermally stable up to at least 800° C.

In this paper structure, the mica enhances the flame barrier and dimensional stability. The flake shape of mica plate has anisotropic thermal conductivity (thermal conductivity in z direction is hundred times lower than that of x-y direction) and this characteristic provides improved thermal insulation through plane of the paper. It is believed that at least 30 weight percent mica is needed in the paper to provide good dimensional stability. Surprisingly, it was found that if at least 30 weight percent mica is used in the paper structure, the paper structure is thermally stable and has essentially no shrinkage (meaning a length or width change of +/−5 percent or less at 200° C.) even though aramid fibrid shrinks significantly at higher temperatures (200° C. or higher). In some embodiments, the paper comprises a mixture of 50 to 60 weight percent aerogel-containing fibrids and 40 to 50 weight percent mica.

The mica includes muscovite or phlogopite mica, or blends thereof, and may be calcined or uncalcined mica. "Calcined mica" as used herein means mica that is obtained by heating natural mica to a high temperature (usually greater than 800° C., sometimes more than 950° C.). This treatment removes water and impurities and improves the temperature resistance of the mica. Calcined mica is normally used in the form of a flake particle and mica of the muscovite type is preferred. "Uncalcined mica" as used herein means mica that is essentially in pure natural form that has preferably been homogenized and purified to remove imperfections and impurities. Uncalcined mica can form a very porous mica layer due to the larger size of the natural mica flakes. The preferred mica is calcined mica, due to its improved dielectric properties and corona resistance over uncalcined mica.

The term fibrids, as used herein, means very small, nongranular, fibrous or film-like particles with at least one of their three dimensions being of minor magnitude relative to the largest dimension. These particles are prepared by precipitation of a solution of supporting material using a non-solvent under high shear, as disclosed for example in U.S. Pat. Nos. 2,988,782 and 2,999,788. Aramid fibrids are non-granular film-like particles of aromatic polyamide having a melting point or decomposition point above 320° C. The preferred aramid fibrid is a meta-aramid fibrid, and especially preferred are fibrids made from the meta-aramid poly(meta-phenylene isophthalamide) (MPD-I).

Fibrids generally have a largest dimension length in the range of about 0.1 mm to about 1 mm with a length-to-width aspect ratio of about 5:1 to about 10:1. The thickness dimension is on the order of a fraction of a micron, for example, about 0.1 microns to about 1.0 micron. While not required, it is preferred to incorporate aramid fibrids into paper while the fibrids are in a never-dried state. As used herein, "fibrids" and "fibrid binder" are used interchangeably.

The fibrids comprise a blend of 80 to 20 weight percent polymer and 20 to 80 weight percent aerogel powder, based on the total weight of the polymer and aerogel powder in the fibrids. Aerogel powders are porous structures with high surface areas (600~800 m²/g). A certain ratio of polymer to aerogel polymer is needed to bind the aerogel powders in the fibril. Without proper bonding between aerogel powders and polymer, unbounded aerogel powder can induce bubble formation and dust particle generation during paper making process. Therefore, it is believed the minimum amount of polymer needed to adequately bind the aerogel powder is 20 weight percent. Likewise, at least at least 20 weight percent of aerogel powers are needed in the fibrid structure to provide the desired lower thermal conductivity. In some embodiments, the fibrids comprise a blend of 60 to 40 weight percent polymer and 40 to 60 weight percent aerogel powder.

By aerogel, it is meant a synthetic porous ultralight material derived from a gel, in which the liquid component for the gel has been replaced with a gas. The result is a solid with extremely low density and low thermal conductivity. Aerogels can be made from a variety of chemical compounds, but silica aerogel is the preferred and the most common type of aerogel.

As used herein, the terms "aerogel", "aerogel powder", and "aerogel particles" are used interchangeably to mean preferred aerogels that are highly porous, hydrophobic, high surface area, preferably amorphous silica particles or granules having a particle size range of from 10 nanometers to 50 micrometers (0.00001 to 0.05 millimeters), and preferably a particle size range of from 0.05 to 20 micrometers. In general, they are chemically similar to common fumed silica products but have larger aggregate sizes, higher surface areas and larger pore volumes, including higher porosity (>95%), lower density (0.03~0.1 g/cm³), small average pore diameter (20 nm), lower thermal conductivity (0.017~0.022 W/mK), higher surface area (600~800 m²/g) and are generally produced in a sol gel manufacturing process. Pioneering patents describing aerogels include U.S. Pat. Nos. 2,093, 454; 2,188,007; and 2,249,767 to Kistler, and more recent disclosures are available, such as U.S. Pat. Nos.8,518,335 & 8,961,919 to Joung et al.

FIG. 1 is a surface SEM photo image of a paper made solely from fibrids, wherein the fibrids were made from a blend of polymer and aerogel powder, in this case the paper having overall 50 weight percent MPD-I polymer and 50 weight percent aerogel powder. That is, a polymer solution containing a mixture of the polymer and aerogel powder was provided to a fibridator or other device that aggressively shears the polymer solution in the presence of a non-solvent, typically water, to make fibrids from the mixture of polymer and aerogel powder. These fibrids, or the dispersion used to make the fibrids that contains the fibrids, is then used to make an aqueous headbox furnish. The furnish can have other additives, and water may be added or removed to obtain the desired consistency. The furnish containing the dispersion of aerogel-containing fibrids is provided to or poured on a screen to make a paper from the dispersion solids.

FIG. 1 shows the surprisingly interaction or fibrid formation around aerogel particles under 10 micrometer magnification. The aerogel particles 1 are held in place in the paper by tentacles of polymer 2, forming a web-like connection between the aerogel and fibrid in the paper structure. This provides a paper having no or reduced dust-making potential. Additionally, the surface of the paper has a smooth, non-grainy feel, representative of the improved attachment of the aerogel particles in the sheet.

Figure 2:
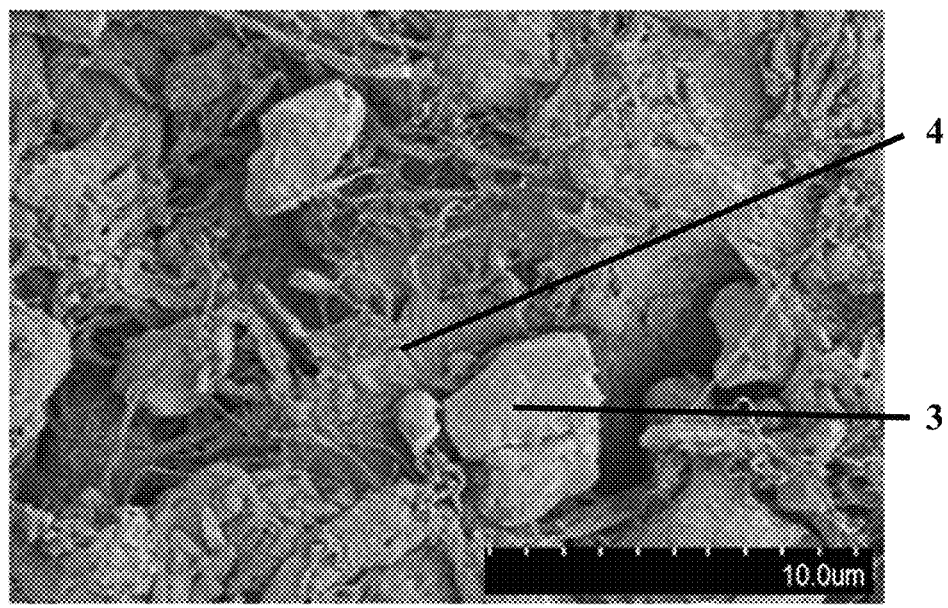
FIG. 2 is a surface SEM photo image of a comparative paper made solely from fibrids and aerogel powder; however, this paper was made by first making polymer fibrids without any aerogel powder. The aerogel-free polymer fibrids were then simply mixed with the appropriate amount of aerogel powder in water to make an aqueous headbox furnish for making the paper.

FIG. 2 is a surface SEM photo image of a comparative paper made solely from fibrids and aerogel polymer, the paper again having overall 50 weight percent MPD-I polymer fibrids and 50 weight percent aerogel powder; however, this paper was made by first making polymer fibrids without any aerogels. The aerogel-free polymer fibrids were then simply mixed with the appropriate amount of aerogel powder in water to make an aqueous headbox furnish; that is, a dispersion of fibrids and the aerogel particles in water that was then provided to a screen to make a paper. As seen in the photo image under 10 micrometer magnification, no appreciable bonding of the aerogel particles 3 to the fibrids 4 is present. Therefore, there is little to prevent the aerogel particle dust from being created by the paper. Additionally, the surface of the paper had a rough, grainy feel representative of the lack of attachment of the aerogel particles.

Figure 3:
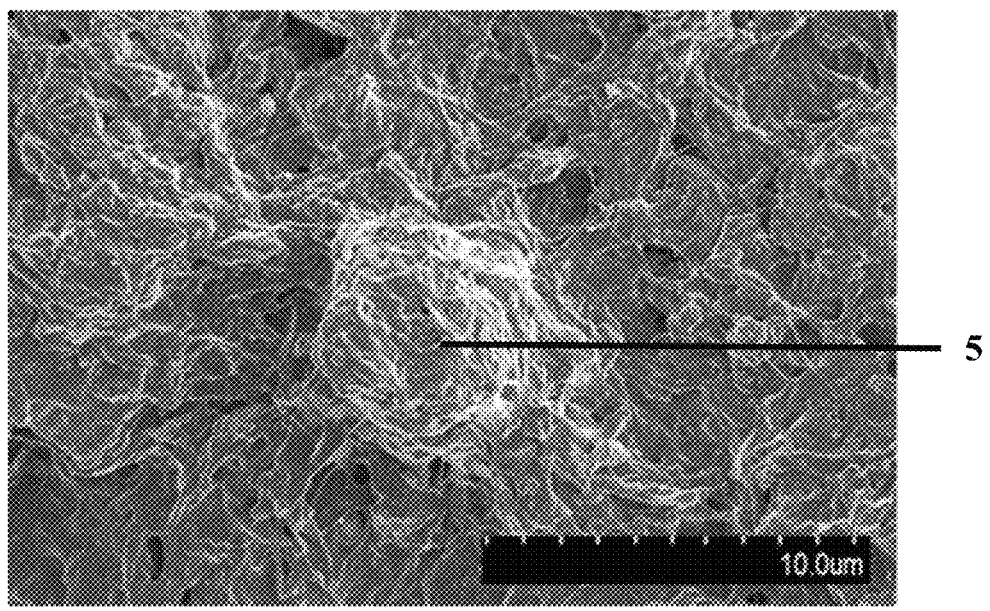
FIG. 3 is a surface SEM photo image of a comparative paper made solely from fibrids, wherein the fibrids were made from a blend of polymer fibrids and activated carbon

FIG. 3 is a surface SEM photo image of a comparative paper made solely from fibrids, wherein the fibrids were made from a blend of polymer and activated carbon, the fibrids again having an overall 50 weight percent MPD-I polymer fibrids and 50 weight percent activated carbon powder. The activated carbon was Type PCB-G obtained from Calgon Carbon Corp. of Pittsburg, Pa. This paper was made by a process similar to the paper shown in FIG. 1, that is, a polymer solution containing a mixture of the polymer and carbon black powder was provided to a fibridator and fibrids were made from the mixture, and these fibrids containing carbon black were then used to make an aqueous headbox furnish; that is, a dispersion of the carbon black-containing fibrids in water, that were then provided to a screen to make a paper. The surface SEM photo image shows the surface structure of this paper is much different from the aerogel-containing fibrid paper. The activated carbon 5 is encapsulated by the fibrid polymer as described in U.S. Pat. No. 5,482,773 to Bair, rather than being attached by tentacles of polymer. It is believed this indicates the low density of the aerogel polymer makes those particles much harder to attach to the polymer structure than the activated carbon.

Figure 4:
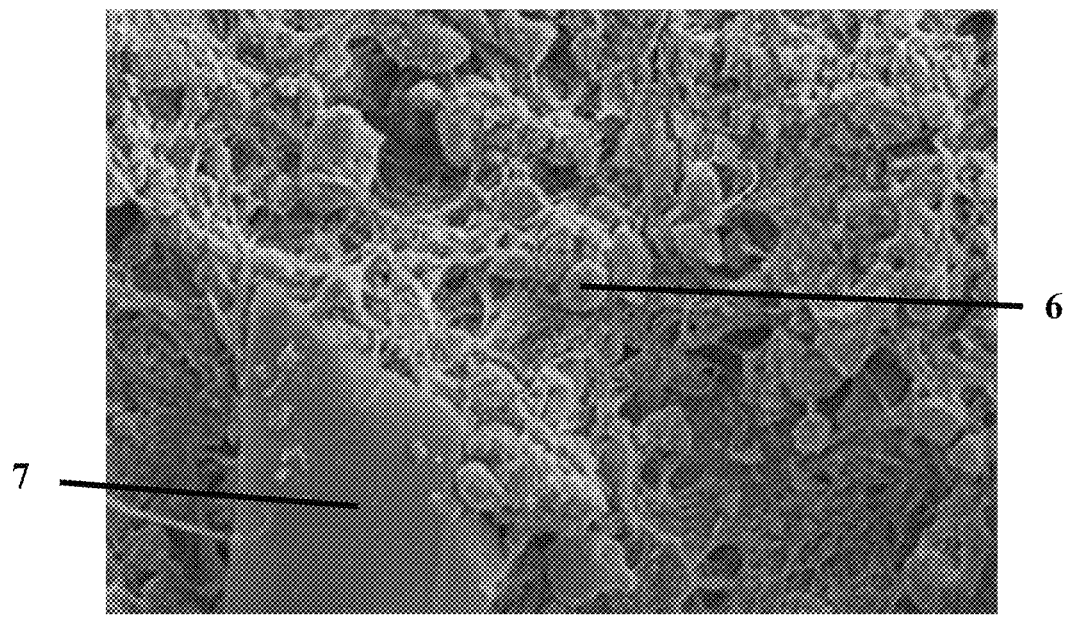
FIG. 4 is a surface SEM photo image of an inventive paper made from the combination of mica and fibrids, wherein the fibrids were made from a blend of polymer and aerogel powder.

FIG. 4 is a surface SEM photo image of an inventive paper made from the combination of mica 7 and fibrids, the fibrids having been made from a blend of polymer and aerogel powder 6, The aerogel particles are held in place by tentacles of polymer, forming a web-like connection between the aerogel and fibrid in the paper structure. This image is shown under 50 micrometer magnification because the mica flake is several orders of magnitude larger than the aerogel particles.

The paper has a thickness of 100 to 4000 micrometers (0.1 to 4 millimeters). The minimum gap between the cells (either pouch or prismatic type cell) is almost 0.1 mm to allow criteria of current battery design, and also, battery cell and module designers make battery pack design as compact as possible because of the limited space in electrical vehicles. Therefore, more than a 4 mm gap between two cells is generally not desirable. In some embodiments, the paper has a thickness of 300 to 3000 micrometers (0.3 to 3 millimeters). In some embodiments, the paper can have a basis weight of from 50 to 500 grams per square meter. In some embodiments, the paper has a basis weight of from 100 to 300 grams per square meter.

As an optional embodiment, the paper containing mica and aerogel powder fibrid binder can further comprise a floc, the floc being present in an amount as much as 20 weight percent (i.e. 0-20 weight percent) based on the total weight of the fibrids, mica, and floc in the paper. In some embodiments 5 to 15 weight percent floc is desired in the paper, based on the total weight of the fibrids, mica, and floc in the paper.

The term floc, as used herein, means fibers having a short length and that are customarily used in the preparation of wet-laid sheets and/or papers. Typically, floc has a length of from about 3 to about 20 millimeters. A preferred length of floc is from about 3 to about 7 millimeters. Floc is normally produced by cutting continuous fibers into the required lengths using well-known methods in the art. A preferred floc is an aramid floc; that is, a floc made from an aramid polymer fiber. A preferred aramid floc is poly(metaphenylene isophthalamide) (MPD-I) floc.

The term aramid, as used herein, means aromatic polyamide, wherein at least 85% of the amide (—CONH—) linkages are attached directly to two aromatic rings. Optionally, additives can be used with the aramid and may be dispersed throughout the polymer structure. It has been found that up to as much as about 10 percent by weight of other supporting material can be blended with the aramid. It has also been found that copolymers can be used having as much as about 10 percent of other diamines substituted for the diamine of the aramid or as much as about 10 percent of other diacid chlorides substituted for the diacid chloride of the aramid.

The preferred polymer for both fibrids and the optional floc is an aramid polymer, and specifically preferred for both fibrids and the optional floc is a meta-aramid polymer. The aramid polymer is considered a meta-aramid polymer when the two rings or radicals are meta oriented with respect to each other along the molecular chain. The preferred meta-aramid for both the fibrids and the optional floc is poly (meta-phenylene isophthalamide)(MPD-I). U.S. Pat. Nos. 3,063,966; 3,227,793; 3,287,324; 3,414,645; and 5,667,743 are illustrative of useful methods for making aramid fibers that could be used to make aramid floc.

Alternatively, the aramid floc can be a para-aramid or an aramid copolymer. The aramid polymer is considered a para-aramid when the two rings or radicals are para oriented with respect to each other along the molecular chain. Methods for making para-aramid fibers are generally disclosed in, for example, U.S. Pat. Nos. 3,869,430; 3,869,429; and 3,767,756. One preferred para-aramid is poly (paraphenylene terephthalamide); and one preferred para-aramid copolymer is co-poly (p-phenylene/3,4'diphenyl ester terephthalamide).

Specifically, commercially-suitable processes for making the inventive papers comprising aerogel-containing fibrids and mica, and optional floc, on a paper-making machine can include providing an aqueous dispersion containing the mica and fibrous material, in the desired amount and proportion, to the headbox of the paper-making machine and then uniformly wet-laying and dispersing these solids as a web onto a papermaking wire and removing the majority of the liquid water. The wet web can then be dried on dryer drums to form a paper. In some embodiments, the paper can be further calendered or pressed in the nip of a hot roll calender under pressure and heat, or by other means, to consolidate and densify the paper into a layer having the desired thickness and properties. If desired, two or more lighter basis weight or thinner wet webs of the same composition can be made separately and then calendered and consolidated together into a single layer.

Figure 6:
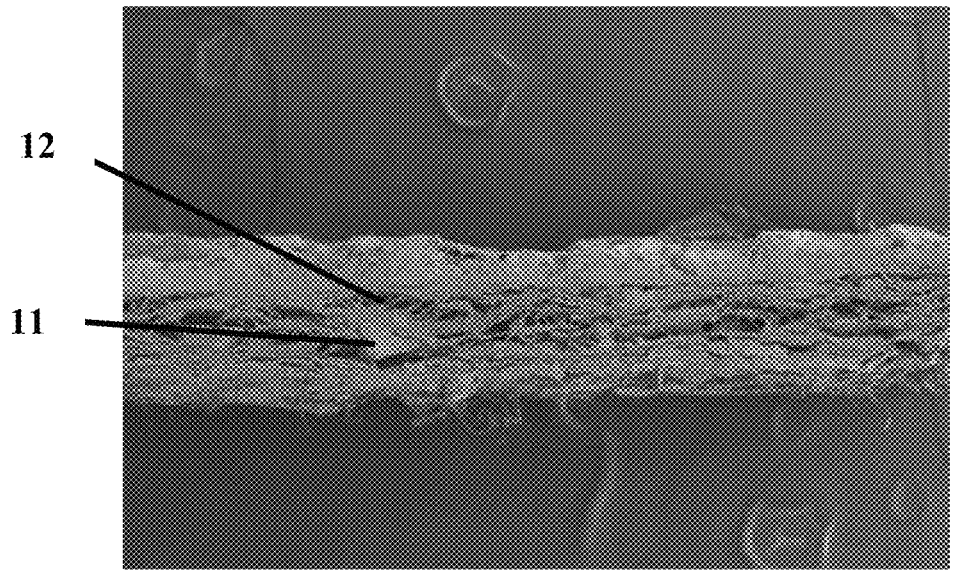
FIG. 6 is a cross-sectional view of a calendered or densified paper made solely from fibrids, wherein the fibrids were made from a blend of polymer and aerogel powder.
Figure 7:
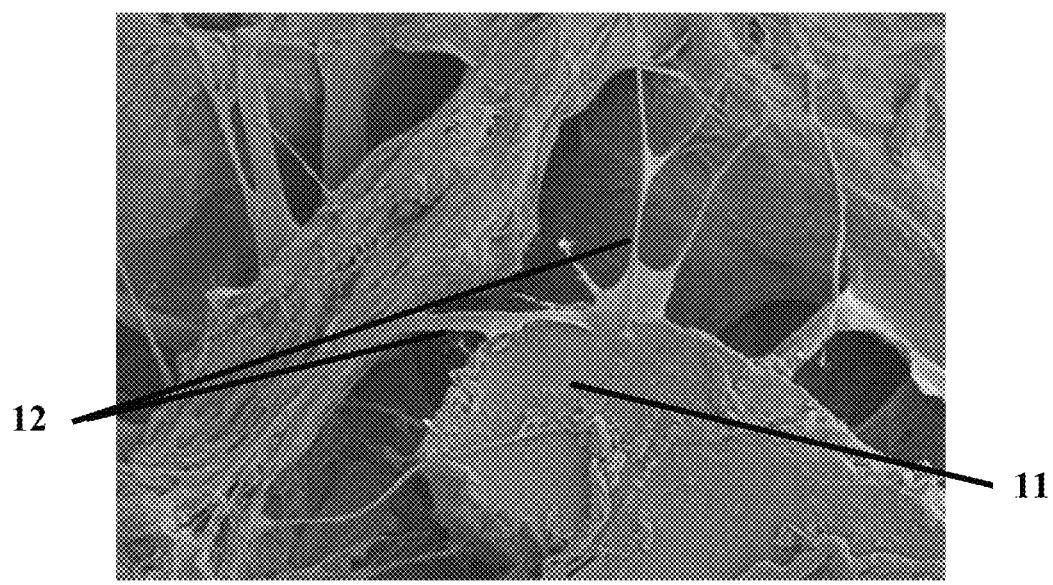
FIG. 7 is a surface SEM photo image of a calendered or densified paper made solely from fibrids, wherein the fibrids were made from a blend of polymer and aerogel powder.

FIGS. 6 & 7 cross sectional and surface views, respectively, of calendered papers made solely from fibrids, wherein the fibrids were made from a blend of polymer and aerogel powder, under 500 micrometer magnification and under 10 micrometer magnification respectively, showing at least some of the surprising interaction or fibrid formation around aerogel particles is retained in the sheet after densification. The aerogel particles 11 are held in place in the paper by tentacles of polymer 12, forming a web-like connection between the aerogel and fibrid in the paper structure.

Representative devices and machinery that can be used to make paper include continuous processing equipment such as, for example without limitation to, a Fourdrinier or inclined wire machine, or batch processing equipment such as those that make paper by hand in a hand-sheet mold containing a forming screen. Reference may be made to U.S. Pat. No. 3,756,908 to Gross and U.S. Pat. No. 5,026,456 to Hesler et al. for general processes of forming aramid materials into papers.

In some embodiments, the paper has a tensile strength of 0.5 to 100 megapascals (MPa). In some applications, it is desirable for the paper to have a tensile strength of at least 15 megapascals or greater. For example, it is believed the paper needs this level of tensile strength to survive some battery fabrication processes, which can include the cell winding process (wrapping separator with current collector, anode and cathode). The tensile strength also contributes to the flame barrier of the separator in use. Paper tensile strengths above 100 megapascals do not have negative effects, but the parameter reaches a point of diminishing value. Therefore, in some preferred embodiments, the paper has a tensile strength of from 15 to 50 megapascals. In some embodiments, the paper has a tensile strength of from 15 to 100 megapascals.

In some embodiments, the paper has a thermal conductivity of 0.015 to 0.05 watt per meter Kelvin (W/mK). To prevent thermal propagation effectively, papers having a lower thermal conductivity that is stable over a wide range of operating temperature including battery operating temperature (−40° C. to 80° C.) and up to thermal hot spot temperature (800° C.~1,000° C.) is preferred. In some embodiments, the paper has a thermal conductivity of from 0.015 to 0.04 W/mK.

In some embodiments, a 1 mm (+/−30%) thick paper comprising the mica and aerogel-containing fibrids exhibits a TPP flame performance of at least 10 seconds to an equivalent 2nd degree burn, as measured by the Thermal Performance Protection Test (TPP); and some embodiments, that paper exhibits a TPP flame performance of at least 12 seconds to an equivalent 2nd degree burn.

It is believed there is a synergistic effect on paper thermal and mechanical properties resulting from the combination of mica and aerogel-containing fibrids. The inventive paper shows steadily increasing in dielectric strength with increasing mica content, but also shows steadily decreasing mechanical strength and toughness (tensile strength and elongation). However, increasing amounts of aerogel powders in the fibrids improves the thermal insulation (lowering the thermal conductivity) as well as better flame protection (TPP). In some instances, the inventive papers, containing the combination of mica and aerogel-containing fibrids, have almost half the thermal conductivity (i.e. twice the insulative property) while providing twice the thermal protection (TPP) when compared to papers made by simply mixing the mica, aerogel, and fibrids together and making paper. These outstanding properties as well as the significant improvement in shedding issues indicate these papers are suitable for use as battery thermal insulation and flame barriers (cell-to-cell, cell-to-module, inside module and pack, and the like).

A battery comprising the paper(s) described herein can be made by using the paper(s) as cell-to-cell insulation. That is, the paper is inserted between individual battery cells in a multi-cell battery structure to provide a flame barrier and thermal insulation between individual battery cells. Representative battery types include, but are not limited to, multi-cell battery structures having battery cells positioned either in parallel or in series that are commonly known as battery blocks and battery packs. However, other batteries comprising the described paper(s) are possible, as long at the paper(s) are intended to thermally isolate each battery cell and retard the transfer of heat energy and/or flame from one cell to another cell or structure.

Test Methods

The following test methods were used in the Examples provided below.

Thickness was measured according to TAPPI 411 using 5 N/cm² weight and reported in mm.

Basis Weight was measured according to ASTM D 645 and ASTM D 645-M-96 and reported in g/m².

Tensile Strength was measured according to ASTM D 828-93 with 2.54 cm wide test specimens and a gage length of 18 cm and reported in N/cm or MPa.

Dielectric Strength was measured according to ASTM D149-97A and reported in kV/cm.

Thermal Conductivity was measured according to ASTM E 1530 and reported in W/mK.

Thermal Performance Protection Test (TPP) is a measure of the flammability performance of fabrics and sheets of material, providing realistic conditions of an exposure to combined radiant and convective heat. A sample is subjected to circumstances typical for fires: a constant combination of 50% radiant heat and 50% convective heat, at a constant heat flux of 84 kW/m² (2 cal/cm²/sec). The test then measures the time that elapses and the amount of heat energy per surface area (TPP value) at which the temperature and energy transferred to the back of the fabric reaches a level that is equivalent to a second-degree burn, if the material was being worn. The TPP test method used is the test method that has been adopted by ISO as a test method standard (ISO 17492) with a heat flux exposure of 80 kW/m²; however, the US NFPA 1971 standard requires the ISO 17492 test to be carried out at a modified, increased heat flux exposure of 84 kW/m², and this higher heat flux was used herein.

EXAMPLE 1

Aerogel-aramid fibrid papers were made having lower thermal conductivity and higher flame resistance. A dispersion of polymer in solvent containing aerogel powder particles was made by combining 65 parts by weight of the solvent dimethylacetamide, 15 parts by weight of poly (metaphenylene isophthalamide) (MPD-I) polymer, 5 parts by weight calcium chloride as a solubility enhancer, and 15 parts by weight of aerogel powder (Type IC 3100 Enova® Aerogel, obtained from Cabot Corp. of Boston, Mass.) in a kettle while stirring until a uniform mixture was obtained. The mixture was then poured slowly into a vigorously-stirring waring blender, which simultaneously coagulated the polymer from the solvent into filmy fibrids, where the MPD-I polymer and aerogel powder was present in a 1:1 ratio and designated Item 1-1. The resulting fibrids were collected on a Buchner funnel as a wet-laid paper and washed with de-ionized water until all the fibrids have been thoroughly washed into the funnel. The papers were then dried, and the dried papers exhibited a smooth, non-shedding surface. As shown in FIG. 1, the aerogel powder particles were anchored in the fibrids by tentacles of polymer around the particles.

This was repeated three additional times, except that the amount of aerogel powder was reduced each time to form fibrids having a MPD-I polymer to aerogel ratio of 1.0 to 0.75, 1:0 to 0.5, and 1 to 0.25; which were designated Items 1-2, 1-3, and 1-4, respectively. To analyze the different amount of silicate, and therefore the amount of Aerogel anchored in all four fibrid samples, TGA thermal gravity analysis (TGA) was done on all for Items using a TA instruments Q500 TGA (40-700C) with high resolution in the air. The results are shown in the Table 1 illustrating the aerogel powder particles were anchored in the fibrid polymer.

TABLE 1

| Item | Ratio of ingredients (MPD-I: Aerogel) | Theoretical Amount of Aerogel Anchored in Fibrid (wt %) | Actual Amount of Aerogel Anchored in Fibrid (wt. %) |
|---|---|---|---|
| 1-1 | 1.0:1.0 | 50 | 51.6 |
| 1-2 | 1.0:0.75 | 42.8 | 42.9 |
| 1-3 | 1.0:0.5 | 33.3 | 35.8 |
| 1-4 | 1.0:0.25 | 20 | 22.6 |

Figure 5:
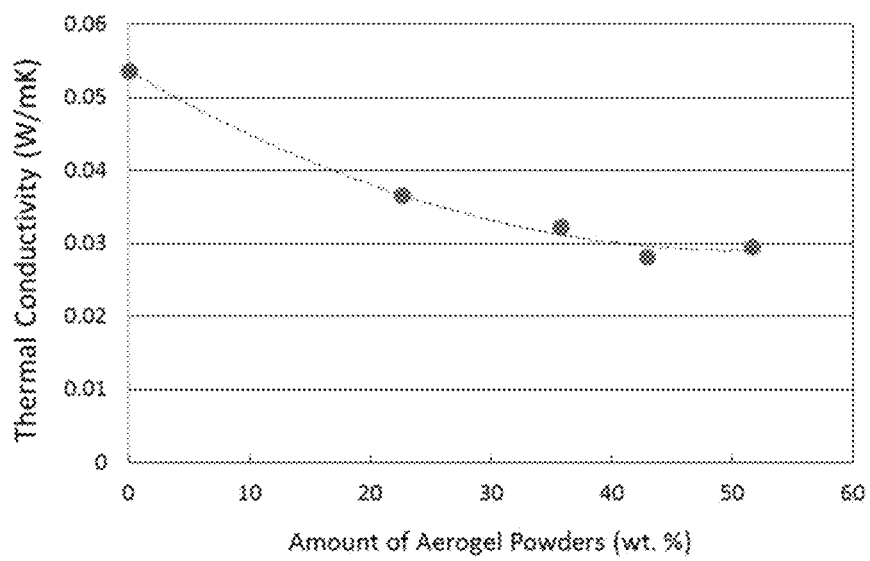
FIG. 5 is a plot of thermal conductivity of several papers made solely from fibrids, wherein the fibrids were made from a blend of polymer and aerogel powder, showing the affect differing amounts of total aerogel powder in the fibrids have on paper thermal conductivity.

The thermal conductivity was then measured on these paper samples using thin film method with transient plane source (TPS 1500) with a pressure of 2.45 kg on 2" diameter stacked samples. The effect of aerogel particles on the thermal conductivity (TC) of composite structure was shown in the graph FIG. 5, compared with a control paper sample of aerogel-free (0 wt %) polymer fibrids. Thermal conductivity was found to be lowered down from 0.054 W/mK to 0.028 W/mK by adding slightly higher than 40 weight percent of aerogel particles.

EXAMPLE 2

Papers were made containing both mica and aerogel-containing MPD-I fibrids, the papers having lower thermal conductivity and higher flame resistance. Four separate aqueous dispersions were made as in Example 1, each containing one of the four fibrid samples of Example 1. An amount of calcined mica flake which was weighed and added separately to each dispersion. The mica was the muscovite type available from the Electrical Samica Flake Co., Rutland, Vt. In addition, for a control handsheet, another dispersion was made by combining aerogel-free fibrids (100% MPD-I fibrids), mica, and aerogel powder. The relative amounts of each ingredient for the inventive and comparative papers are listed in Table 2.

TABLE 2

| | | Composition (nominal wt. %) | | | |
|---|---|---|---|---|---|
| | | Blend Fibrids | | Aerogel- | |
| Paper | Mica | Polymer | Aerogel | Free Fibrids | Aerogel |
| 2-1 | 20 | 40 | 40 | — | — |
| 2-2 | 30 | 40 | 30 | — | — |
| 2-3 | 40 | 40 | 20 | — | — |
| 2-4 | 50 | 40 | 10 | — | — |
| A | 40 | — | — | 40 | 20* |

*Nominal based on starting materials-see "Comparative Example A" below

Each aqueous dispersion was poured with 8 liters of water into a 21×21 cm handsheet mold and four wet-laid papers designated 2-1 thru 2-4 were formed. The handsheets were then individually placed between two pieces of blotting paper, hand couched with a rolling pin and dried in a handsheet dryer at 150° C. for 10 minutes. The dried papers exhibited a smooth, non-shedding surface. The physical and thermal properties of the handsheets (as described in the test methods) are shown in Table 3.

Comparative Example A

Comparative Paper A was prepared by combining in water 2 grams of aerogel powder; 4 grams of MPD-I fibrids that were aerogel-free and made in a manner generally described in U.S. Pat. No. 3,756,908; and 4 grams of calcined mica flake to form an aqueous dispersion. The aqueous dispersion was then used to form handsheets as in Example 2. The dried papers exhibited a grainy, shedding surface. The physical and thermal properties are shown in Table 3. TGA (thermal gravimetric analysis) of the dried paper showed that the residue of aerogel particles weighed about 1.75 gram left, which means roughly 30% original aerogel powder was lost during the paper making process. The data in Table 3 illustrates the synergistic effect on paper thermal and mechanical properties resulting from the combination of mica and aerogel-containing fibrids. The paper shows steadily increasing in dielectric strength with increasing mica content, but also shows steadily decreasing mechanical strength and toughness (tensile strength and elongation). However, increasing amounts of aerogel powders in the fibrids improved the thermal insulation (lowering the thermal conductivity) as well as better flame protection (TPP). Both the Comparative Example A and Example 2-3 papers were made with 20 weight percent aerogel powder; however, the Example 2-3 paper has almost half the thermal conductivity (i.e. twice the insulative property) and twice the thermal protection (TPP) as the Comparative Example A paper. These outstanding properties as well as significant improvement in shedding issues indicate these papers are suitable for use as battery thermal insulation and flame barriers (cell-to-cell, cell-to-module, inside module and pack, and the like).

TABLE 3

| | Examples and Comparative Example | | | | |
|---|---|---|---|---|---|
| Properties | 2-1 | 2-2 | 2-3 | 2-4 | A |
| Thickness (mm) | 1.07 | 1.10 | 0.97 | 0.94 | 0.95 |
| Basis Weight (g/m$^2$) | 225 | 236 | 242 | 270 | 245 |
| Tensile Strength (MPa) | 5.9 | 4.6 | 3.2 | 1.4 | 5.2 |
| Elongation (%) | 4.5 | 3.4 | 3.6 | 2.3 | 10.6 |
| Dielectric Strength (kV/cm) | 147 | 155 | 183 | 220 | 190 |
| Thermal Conductivity (W/m-K) | 0.017 | 0.021 | 0.026 | 0.030 | 0.048 |
| TPP 2$^{nd}$ degree burn (seconds) | 16.1 | 15.7 | 14.5 | 12.7 | 6.8 |
| TPP per unit thickness (sec/mm) | 15.1 | 14.3 | 15.0 | 13.5 | 7.2 |

EXAMPLE 3

Example 2 was repeated, but a mica and aerogel-containing fibrid paper, designated 3-1, additionally having a floc was made exactly the same way as in Example 2-2 except 10 weight percent of mica with Nomex® floc (0.22 tex linear density and 0.64 cm length Nomex® fiber available from the DuPont Co., Wilmington, Del.). The addition of floc helped thermal conductivity improvement to 0.025 W/mK but dielectric strength was slightly decreased to 200 kV/cm.

Three more mica, aerogel-containing fibrid, and floc containing papers of varying compositions and designated 3-2, 3-3, and 3-4 were then made in a similar manner and tested for burn performance. All the dried papers exhibited a smooth, non-shedding surface. The composition and test results are shown in Table 4.

TABLE 4

| Paper | Composition (nominal wt. %) | | | | TPP 2nd degree burn (seconds) |
|---|---|---|---|---|---|
| | Mica | Blend Fibrids | | Floc | |
| | | Polymer | Aerogel | | |
| 2-2 | 30 | 40 | 30 | — | 15.7 |
| 3-1 | 20 | 40 | 30 | 10 | 16.5 |
| 3-2 | 20 | 50 | 20 | 10 | 15.1 |
| 3-3 | 40 | 40 | 10 | 10 | 12.5 |
| 3-4 | 10 | 30 | 50 | 10 | 16.8 |

What is claimed is:

1. A paper suitable for use as a cell-to-cell flame barrier in a battery, the paper comprising:
   40 to 70 weight percent fibrids, and
   30 to 60 weight percent mica,
   based on the total weight of the fibrids and mica in the paper; wherein the fibrids comprise a blend of
   80 to 20 weight percent polymer, and
   20 to 80 weight percent aerogel powder,
   based on the total weight of the polymer and aerogel powder in the fibrids;
   the paper having a thickness of 100 to 4000 micrometers.

2. The paper of claim 1 wherein the fibrids comprise a blend of
   60 to 40 weight percent polymer, and
   40 to 60 weight percent aerogel powder.

3. The paper of claim 1 wherein the paper comprises
   50 to 60 weight percent fibrids, and
   40 to 50 weight percent mica.

4. The paper of claim 1 further comprising floc, in an amount as much as 20 weight percent, based on the total weight of the fibrids, mica, and floc in the paper.

5. The paper of claim 4, wherein the floc is an aramid floc.

6. The paper of claim 5, wherein the aramid floc is poly(metaphenylene isophthalamide) floc.

7. The paper of claim 1, wherein the polymer is an aramid.

8. The paper of claim 7, wherein the aramid is poly(metaphenylene isophthalamide).

9. The paper of claim 1 having a thickness of 300 to 3000 micrometers.

10. The paper of claim 1 having a tensile strength of 0.5 to 100 MPa.

11. The paper of claim 1 having a thermal conductivity of 0.015 to 0.05 W/mK.

12. A battery comprising the paper of claim 1.

* * * * *